United States Patent
Senno et al.

(10) Patent No.: US 7,054,244 B2
(45) Date of Patent: May 30, 2006

(54) MODULATION SIGNAL GENERATOR FOR PRODUCING ORIGINAL DISC OF OPTICAL DISC

(75) Inventors: Toshihiko Senno, Kanagawa (JP); Akiya Saito, Kanagawa (JP); Toru Aida, Kanagawa (JP); Yoshinobu Usui, Kanagawa (JP)

(73) Assignee: Sony Disc & Digital Solutions, Inc. (JP)

( * ) Notice: Subject to any disclaimer, the term of this patent is extended or adjusted under 35 U.S.C. 154(b) by 157 days.

(21) Appl. No.: 10/240,781

(22) PCT Filed: Feb. 7, 2002

(86) PCT No.: PCT/JP02/01005

§ 371 (c)(1),
(2), (4) Date: Jan. 15, 2003

(87) PCT Pub. No.: WO02/063622

PCT Pub. Date: Aug. 15, 2002

(65) Prior Publication Data

US 2003/0152008 A1    Aug. 14, 2003

(30) Foreign Application Priority Data

Feb. 8, 2001    (JP)    ............... 2001-032097

(51) Int. Cl.
G11B 7/28    (2006.01)
G11B 7/004    (2006.01)

(52) U.S. Cl. ............... 369/47.19; 369/47.12; 369/59.13; 369/59.24

(58) Field of Classification Search ............ 369/47.12, 369/47.13, 47.19, 53.22, 59.24, 59.25, 80, 369/275.3, 59.12, 48, 59.13; 713/200; 395/430; 386/95

See application file for complete search history.

(56) References Cited

U.S. PATENT DOCUMENTS 5,535,356 A * 7/1996 Kim et al. .................. 711/103
5,629,913 A * 5/1997 Kaku et al. ............. 369/47.52

(Continued)

FOREIGN PATENT DOCUMENTS

JP    63-84768    6/1988

(Continued)

Primary Examiner—William Korzuch
Assistant Examiner—Michael V. Battaglia
(74) Attorney, Agent, or Firm—Rader, Fishman & Grauer PLLC; Ronald P. Kananen

(57) ABSTRACT

The present invention relates to a modulated signal generator capable of carrying out signal processing at a higher speed or capable of supporting a special format and a new format with ease. A modulation processing storing unit 130 has a modulation processing program required for producing an optical disc master 320 stored therein in advance. Information data recorded in an master optical disc 310 is reproduced by an information reproducing unit 110 and is outputted to a modulation controller 120. The modulation controller 120 carries out the signal modulation processing onto the reproduced information data in accordance with the signal modulation processing program so as to generate a data stream and stores the data stream in a modulated information storing unit 140 as necessary. The modulation controller 120 sends a data stream generated at that time or the data stream stored in the modulated information storing unit 140 to a modulated signal outputting unit 150, and the data stream is outputted to a laser beam recorder 200 by the modulated signal outputting unit 150 at a predetermined clock. The present invention can be applied in cases of producing optical discs such as CD, MD, DVD and the like.

3 Claims, 5 Drawing Sheets

U.S. PATENT DOCUMENTS

| | | | |
|---|---|---|---|
| 5,712,837 A * | 1/1998 | Horigome et al. | 369/59.24 |
| 5,715,355 A * | 2/1998 | Yonemitsu et al. | 386/95 |
| 5,734,634 A * | 3/1998 | Ono et al. | 369/44.28 |
| 5,850,378 A * | 12/1998 | Ninamino et al. | 369/59.11 |
| 6,049,514 A * | 4/2000 | Todo | 369/47.25 |
| 6,304,971 B1 * | 10/2001 | Kutaragi et al. | 713/200 |
| 6,356,515 B1 * | 3/2002 | Kumita et al. | 369/13.26 |
| 6,400,676 B1 * | 6/2002 | Arai | 369/275.3 |
| 6,781,937 B1 * | 8/2004 | Nakajo | 369/59.12 |
| 2002/0159367 A1 * | 10/2002 | Ahn | 369/59.24 |

FOREIGN PATENT DOCUMENTS

| | | |
|---|---|---|
| JP | 6-290492 | 10/1994 |
| JP | 2000-286709 | 10/2000 |
| JP | 2000-307431 | 11/2000 |
| JP | 2000-311449 | 11/2000 |
| JP | 2001-6178 | 1/2001 |

* cited by examiner

MODULATION SIGNAL GENERATOR FOR PRODUCING ORIGINAL DISC OF OPTICAL DISC

TECHNICAL FIELD

The present invention relates to a modulated signal generator for producing an optical disc master, and in particular, to the one which generates a modulated signal at the time of producing the optical disc master.

BACKGROUND ART

Generally, in a case of producing a master of optical discs, such as CD (Compact Disk), MD (Mini Disk), DVD (Digital Versatile Disk) and the like, in order to assure recording and reproducing of digital information, error correction and modulation are performed on predetermined information data to be recorded. FIG. 5 is a structural view of a conventional optical disc master producing system. This is a disc master producing system for CD. In the case of CD, so-called EFM (Eight-to-Fourteen Modulation) signal system is adopted.

Predetermined information data to be recorded in an optical disc master 320 is recorded in an master optical disc 310. In an EFM signal generator 400 being a modulated signal generator, a reader drive 410 reads out the information data recorded in the master optical disc 310 and transfers the data to a first signal processor 420. The first signal processor 420 sends the received information data to a second signal processor 430 and instructs a modulation process required to be performed. The second signal processor 430 comprises dedicated ICs or hardware logics, which comprises an ECC (Error Correction Code) /EDC (Error Detection Code) scrambling unit 431, a CIRC (Cross Interleave Reed-Solomon Code) unit 432 and an 9–14 conversion DSV (Digital Sum Value) unit 434 or the like. The second signal processor 430 carries out necessary signal processing on original data transferred from the first signal processor 420 and outputs a modulated signal to an EFM outputting unit 440. The second signal processor 430 carries out signal processing such as ECC generation, EDC generation, data scrambling, CIRC generation, Eight-to-Fourteen conversion, CD sub-code generation, optimization of DSV and interleave processing. The signal modulated by the second signal processor 430 is transferred to a laser beam recorder 200 via the EFM outputting unit 440 so that the optical disc master 320 is produced.

However, the conventional modulated signal generator has a problem that a speed of signal processing and a format to be supported cannot be easily changed. In recent years, the time required for producing an optical disc master has been shortened by having a shorter oscillation interval of a lser beam irradiated from the laser beam recorder 200 as well as having a higher rotation speed of the optical disc master 320 to be cut. For this purpose, it is required that signal modulation is processed at a higher speed. However, since the conventional modulated signal generator carries out the signal processing using the dedicated IC and the hardware logics, it has been necessary to have another dedicated IC for changing an output interval of the modulated signal. Faster signal processing has not been easily realized since it requires a considerable length of time and cost for developing a new dedicated IC.

In addition, in recent years a variety of techniques of adding predetermined information to a moduulated signal by setting a special format for the modulated signal have been suggested. For example, there is a technique to incorporate additional information into the modulated signal for a purpose of preventing illegal copying of the optical disc. Furthermore, there is a need for supporting new formats such as the one in which a recording density of a CD is made twice as a conventional CD. However, in a conventional modulated signal generator, the format which the generator supports is fixed and it is not easy to change the format.

DISCLOSURE OF INVENTION

The present invention has been made in view of the above-mentioned disadvantages, and it is an object of the present invention to provide a modulated signal generator for producing an optical disc master, which enables a faster signal processing or which can easily support a special format and a new format, and also to provide a modulated signal generation method thereof.

A modulated signal generator for producing an optical disc master according to the present invention comprises information reproducing means, modulation processing storing means, a modulation controller means, and modulated signal output means. The information reproducing means reads out predetermined information data from a master medium on which the predetermined information data to be recorded on the optical disc master is stored and reproduces the data. The modulation processing storing means has a modulation processing program recorded therein. The modulation controller means carries out signal modulation processing on the predetermined information data reproduced by the information reproducing means based on the modulation processing program to generate a modulated signal data stream. The modulated signal output means outputs the modulated signal data stream generated by the modulation controller means at a predetermined clock.

There is further provided modulated information storing means for storing the modulated signal data stream generated by a master modulation controller means. A conversion controller means is capable of further controlling the modulated information storing means to store the generated modulated signal data stream therein and controlling the modulated signal data stream stored in the modulated information storing means to be read out if required to be outputted to the modulated signal output means.

The modulation processing program stored in the modulation processing storing means comprises programs in arbitrary units which constitute a signal modulation processing. The modulation processing program to be stored in the modulation processing storing means may be changed if necessary.

The modulation controller means is capable of selecting a modulation processing program in accordance with the predetermined information data stored in the master medium and of carrying out a signal modulation processing in accordance with the selected modulation processing program.

The modulation processing program stored in the modulation processing storing means may be a program for generating an EFM signal data stream, which is an 8–14 modulated signal.

The modulation processing program stored in the modulation processing storing means may be a program for generating an EFM plus signal data stream, which is an 8–16 modulated signal.

A modulated signal generation method for producing an optical disc master according to the present invention comprises the steps of: a recording step for recording a modulation processing program for carrying out a signal modulation processing in which information data is converted into a modulated signal data stream of a predetermined format in modulation processing storing means in advance; a reproducing step for reading out the predetermined information data from an entire information area of a master medium on which the predetermined information data to be recorded in the optical disc master is recorded; a generation step for carrying out the signal modulation processing in accordance with the modulation process program on the reproduced information data and generating a modulated signal data stream; and an outputting step for outputting the modulated signal data stream at a predetermined clock.

In a modulated signal generator and a modulated signal generation method for generating a modulated signal for producing an optical disc master according to the present invention, the modulation processing program for carrying out the signal modulation processing in which the information data is converted into the modulated signal data stream of the predetermined format is stored in the modulation process storing means in advance. Next, the predetermined information data is read out from the entire information area of the master medium in which the predetermined information data to be recorded on the optical disc master and the read out data is reproduced. The signal modulation processing is carried out on the reproduced predetermined information data in accordance with the-modulation process program stored in the modulation process storing means so that the modulated signal data stream is generated. Subsequently, the modulated signal data stream is output at the predetermined clock so that a desired modulated signal is generated.

BEST MODE FOR CARRYING OUT THE INVENTION

Now, embodiments of the present invention will be described with reference to the drawings. Embodiments described below are preferable specific examples of the present invention and various limitations which are technically preferable are applied to those examples. However, the scope of the present invention is not limited to those embodiments.

Figure 1:
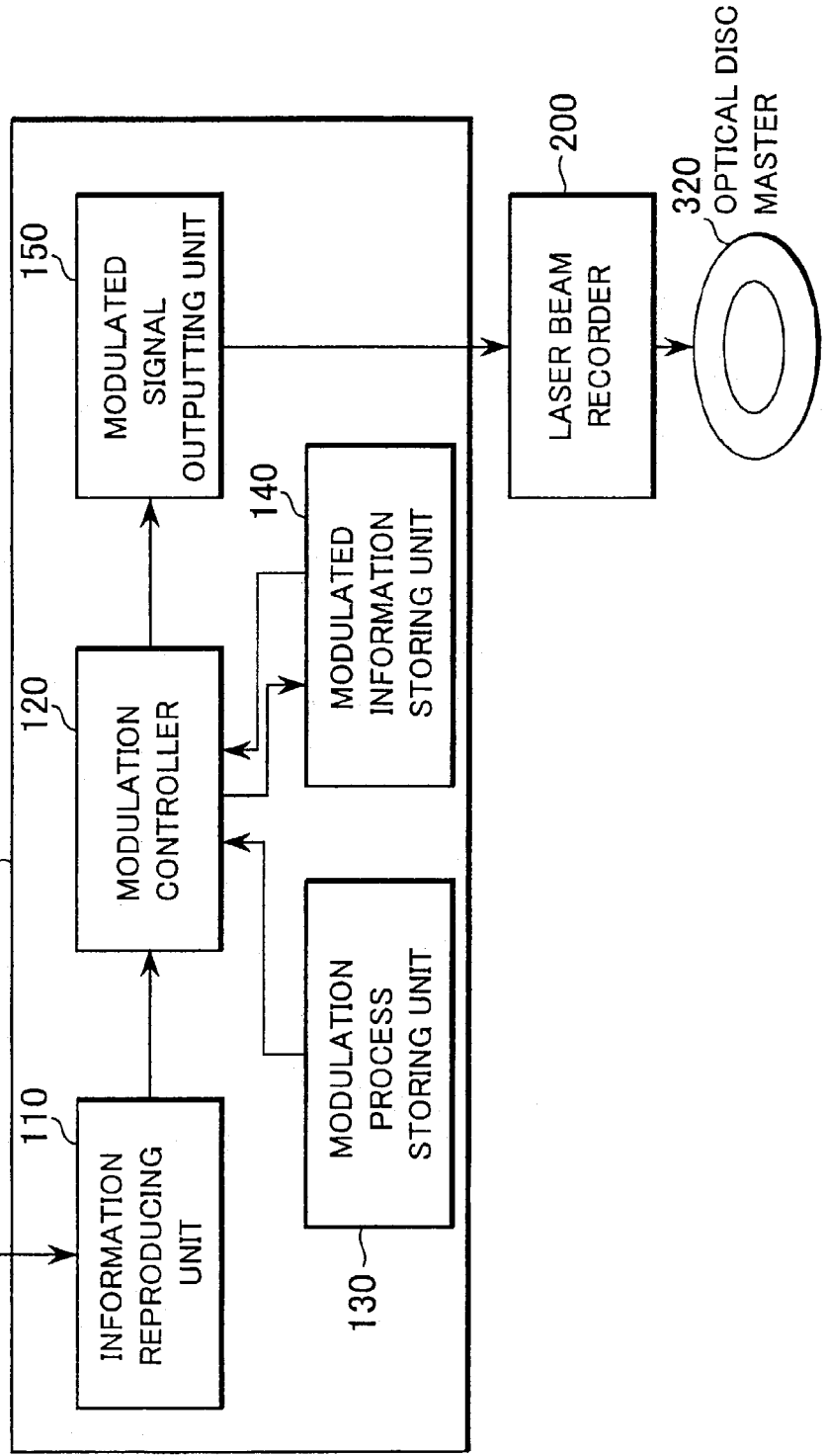
FIG. 1 shows a structural view of a modulated signal generator for producing an optical disc master, which is an embodiment of the present invention.

First, an optical disc master producing device according to the present invention will be explained. FIG. 1 shows a structural view of a modulated signal generator for producing an optical disc master, which is an embodiment of the present invention.

A modulated signal generator 100 for producing an optical disc master according to the present invention comprises an information reproducing unit 110, a modulation controller 120, a modulation processing storing unit 130, a modulated information storing unit 140 and a modulated signal outputting unit 150. The information reproducing unit 110 reproduces information data stored ma master optical disc 310. The modulation controller 120 controls the whole device as well as modulation processing. The modulation processing storing unit 130 stores therein a modulation processing program. The modulated information storing unit 140 stores therein a modulated signal data stream. The modulated signal output unit 150 is modulated signal output means, which outputs a modulated signal.

The modulated signal generator 100 reads out information data recorded in the master optical disc 310, carries out the modulation processing on the information data, and outputs the modulated signal to a laser beam recorder 200.

The information reproducing unit 110 sequentially reproduces the predetermined information data stored in the master optical disc 310 over the entire area, and sends the data to the modulation controller 120. A master optical disc 310 is a master medium (information source) of a CD-R or the like. The master optical disc 310 has recorded therein a predetermined information data to be recorded in an optical disc master 320. The predetermined information data includes arbitrary information such as music data, video data or programs.

The modulation controller 120 is a central processing unit (CPU) or the like. The modulation controller 120 reads out the modulation processing program stored in the modulation processing storing unit 130 and carries out the signal modulation processing on the information data reproduced by the information reproducing unit 110 in accordance witht eh modulation processing program. The modulated signal data stream (hereinafter, simply referred to as "data stream") generated by the signal modulation processing is outputted to the modulated signal output unit 150, while the data stream is also stored in the modulated information storing unit 140. In a case where a plurality of identical optical disc masters 320 are produced, the modulation controller 120 stores the data stream generated at the time of producing an initial optical disc master 320 in the modulated information storing unit 140. At the time of producing an optical disc master 320 of the second or later edition, the data stream stored in the modulated information storing unit 140 is read out to be outputted to the modulated signal outputting unit 150.

The modulation processing storing unit 130 is a memory device for storing therein a modulation processing program for making the modulation controller 120 carry out a signal modulation processing for converting the information data into a data stream of a predetermined format. As the signal modulation processing, a processing required for 8–14 modulation for CD (hereinafter, referred to as "EFM"), for example, an interleave (data sorting) process required for EFM, generation of Reed-Solomon codes, generation of sub-codes, 8–14 conversion, DSV process or the like, is modularized depending on its process contents. Similarly, a process required for 8–16 modulation for DVD (hereinafter, referred to as "EFM plus"), such as an interleave (data sorting) process, generation of Reed-Solomon codes, 8–16 conversion, DSV process and the like, is also modularized. The modulation processing storing unit 130 selects and stores therein each of these modules as required, and the modulation controller 120 reads out a module at an appropriate time. At the time of producing the optical disc master 320, the modulation processing storing unit 130 can store therein the selected modulation processing program. The modulation processing storing unit 130 can store therein several modulation processing programs if only it has enough memory capacity. In such a case, the modulation controller 120 may be arranged to select an optimum program among the several modulation processing programs stored in the modulation processing storing unit 130 with reference to the information read out from the master medium. In addition, in order to address the needs for signal processing at a higher speed and a special format or a new format, a new module required is generated and is additionally stored in the modulation processing storing unit 130.

The modulated information storing unit 140 is a memory device for storing the data stream generated by the modulation controller 120. The data stream stored in the modulated information storing unit 140 can be read out by the modulation controller 120.

The modulated signal outputting unit 150 outputs the data stream outputted from the modulation controller 120 at a predetermined clod so as to generate a modulated signal. The modulated signal is transferred to the laser beam recorder 200. The laser beam recorder 200 carries out cutting on the optical disc master 320 in accordance with the modulated signal. A reference clock of a modulated signal output from the modulated signal outputting unit 150 is set in accordance with the rotation number of the optical disc master 320 subject to the cutting.

An operation of the modulated signal generator for producing an optical disc master having a structure as described above will be explained. The modulation processing storing unit 130 has a modulation processing program required for producing the optical disc master 320 stored therein in advance. The modulation processing program is modularized into predetermined processing units constituting the signal modulation processing. Information data recorded in the master optical disc 310 being a master medium is read out by the information reproducing unit 110 and is reproduced sequentially. The reproduced information data is outputted to the modulation controller 120. The modulation controller 120 carries out the signal modulation processing onto the reproduced information data in accordance with the signal modulation processing program stored in the modulation processing storing unit 130 SO as to generate a data stream. The data stream can be processed as a data file of the modulated information data. The modulation controller 120 stores the data file of the data stream in the modulated information storing unit 140 as required. Subsequently, the modulation controller 120 outputs the data stream to the modulated signal outputting unit 150. The data stream to be outputted may be the one generated at the time or may be the one already stored in the modulated information storing unit 140. The modulated signal outputting 150 receives the data stream and outputs the data stream to the laser beam recorder 200 at a predetermined clock.

The modulated signal generator for producing an optical disc master as explained above does not use a dedicated IC or a hard logic for signal modulation processing so that an optical disc master producing system can be built up at a lower cost. In addition, by replacing the modulation processing program, it is possible to support a variety of formats and to deal with a new format or a special format with ease. In addition, it is possible to generate the modulated signals at a higher speed on the basis of the computing capability of the CPU. This enables signal processing at a higher speed with ease.

Furthermore, it is possible to store the modulated data stream as a data file and to reuse the modulated data stream. In a case of producing a plurality of identical optical disc masters, if only a data stream is generated at the first time, it is possible to reuse the data stream at the next time or later. This enables reduction of time required for producing the optical disc masters.

Figure 2:
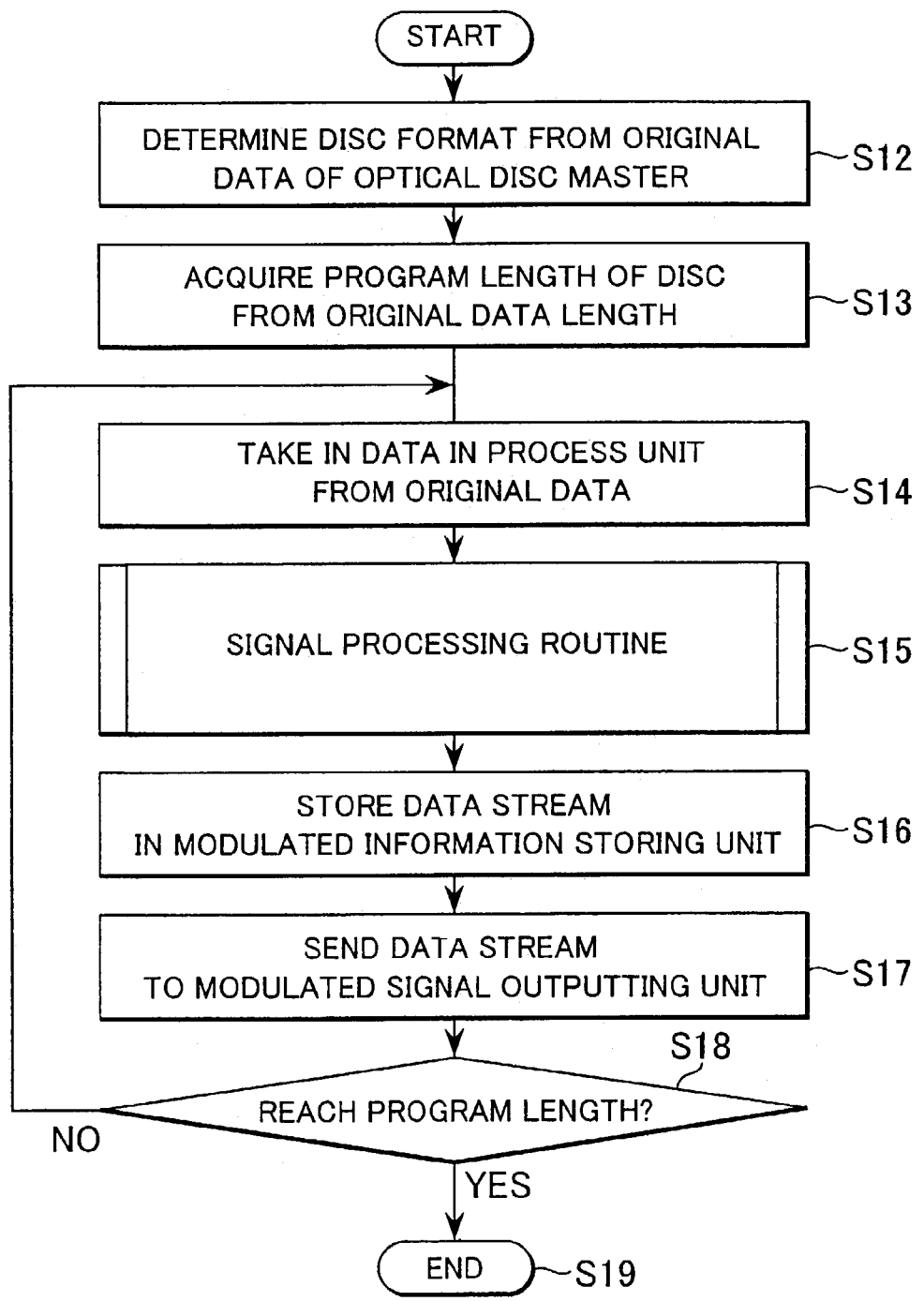
FIG. 2 is a flowchart of a modulated signal generation method for producing an optical disc master, which is an embodiment of the present invention.

Next, the method for generating a modulated signal for producing an optical disc master according to the present invention will be explained. FIG. 2 is a flowchart of the method of generating a modulated signal for producing an optical disc master, which is an embodiment of the present invention. Herein, a CPU, functioning as the above-explained modulation controller 120, generates a modulated signal in accordance with the modulation processing program stored in the modulation processing storing unit 130. In addition, the modulation processing storing unit 130 has recorded therein in advance an EFM processing program for CD and an EFM plus processing program for DVD.

After the processing starts, first in step S12, the CPU checks the original data of the master optical disc 310 so as to determine a format of the optical disc master. This process is carried out for the CPU to determine the format of the disc and to perform a signal modulation processing suitable for the format. For example, when the CPU determines that the disc format is a CD format, a DVD format, a new format or a special format, the CPU changes the signal processing to be performed with the one suitable for the determined format.

Subsequently, in step S13, the CPU acquires a program length of the disc from a length of the original data. The program length is information indicating the number of times later-described processes at step S14 and thereafter, performed per processing unit, should be repeated until the process is completed. The program length is used for the CPU to determine the end of the process in the later-described step S18.

Subsequently, in step S14, the CPU takes in data in a process unit from the original data. The CPU takes in data in a unit which is easy to be processed depending on the format of the signal to be processed. The processing unit is defined by a signal processing routine. For example, data is taken in a unit of 2352 bytes in a case of CD, or in a unit of 1 ECC block (33024 bytes) in a case of DVD.

Subsequently, in step S15, the CPU executes the signal processing routine. In the signal processing routine, the CPU carries out a processing suitable for the disc format and generates a data stream to be outputted. Details of the signal processing routine will be described later. The signal processing routine is modularized depending on the process contents. Accordingly, it is possible to deal with different signal processing content corresponding to the format to be processed as well as to add or replace a processing step for a new format or a special format.

Subsequently, in step S16, the CPU stores, where necessary, the data stream generated by the signal processing routine (processing in step S15) in the modulated information storing unit 140. For example, the data stream is stored in a HDD (Hard Disk Drive) or the like in a case where the data stream is reused, such as a case of producing a plurality of the optical disc masters 320. Since the second or later edition of the optical disc master 320 can be cut by reusing the stored data stream, time required for producing the optical disc master 320 can be reduced.

Subsequently, in step S17, the CPU sends the data stream to the modulated signal outputting unit 150. The CPU reads out the data stream generated by the signal processing routine (the process in step S15) or the data stream temporarily stored in the modulated information storing unit 140 in the process in step S16 and outputs the data stream. The EFM signal or the EFM plus signal generated at the modulated signal outputting unit 150 is sent to the laser beam recorder 200.

In step S18, subsequently, the CPU determines whether or not a signal corresponding to the program length has been outputted. If it is determiend the signal of the program length has been outputted, the process is finished. On the other hand, if it is determined the signal of the program length has not been outputted, the process goes back to step S14 and repeats the subsequent steps. In other words, the CPU repeats the processes of steps S14 to S18 until the signal of the program length is outputted.

Next, the signal processing routine in the above described step S15 will be explained in detail. The signal processing routine is modularized depending on the process contents. Accordingly, it is possible to deal with different signal processing contents corresponding to the format to be processed. Furthermore, it is possible to add or to replace a process for a new format or a special format.

Figure 3:
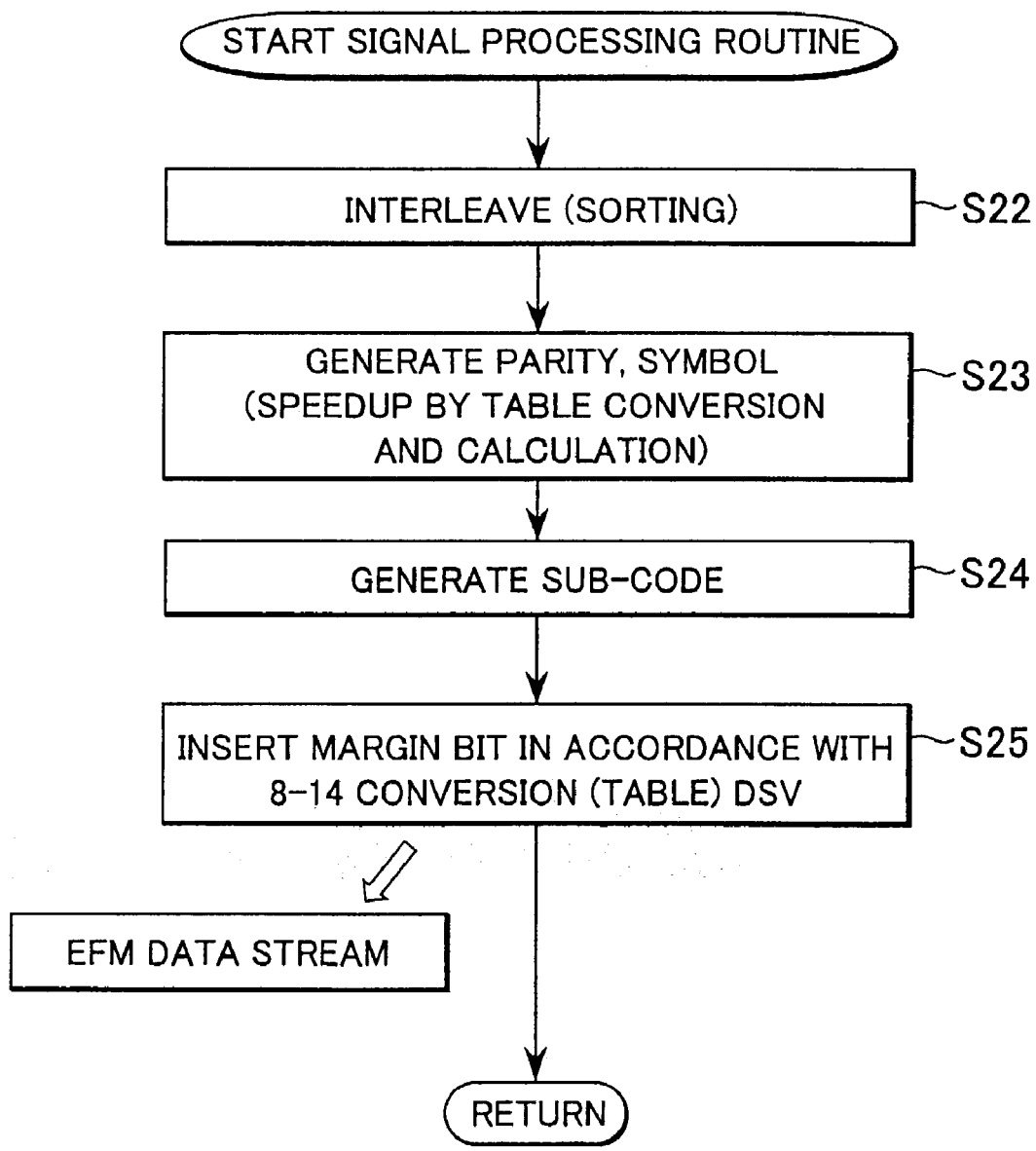
FIG. 3 is a flowchart of a signal processing routine of Eight-to-Fourteen Modulation of step S15 in FIG. 2, which is an embodiment of the present invention.

First, the EFM signal processing used for CD will be described. FIG. 3 is a flowchart of a signal processing routine of the EFM, which is an embodiment of the present invention.

The signal processing routine of the EFM is called out after data of a process unit is taken in so as to start the process. At this point, the format to be processed is already determined.

In step S22, the CPU executes interleave (data sorting). The CPU carries out table conversion and calculation so as to generate parity of Reed-Solomon Code for CD in step S23, and generates a sub-code for CD in step S24. Next, in step S25, the CPU carries out 8–14 conversion using a conversion table, calculates DSV so as to decide and insert a margin bit, generates an EFM data stream and returns to the flow of the signal generation method.

Figure 4:
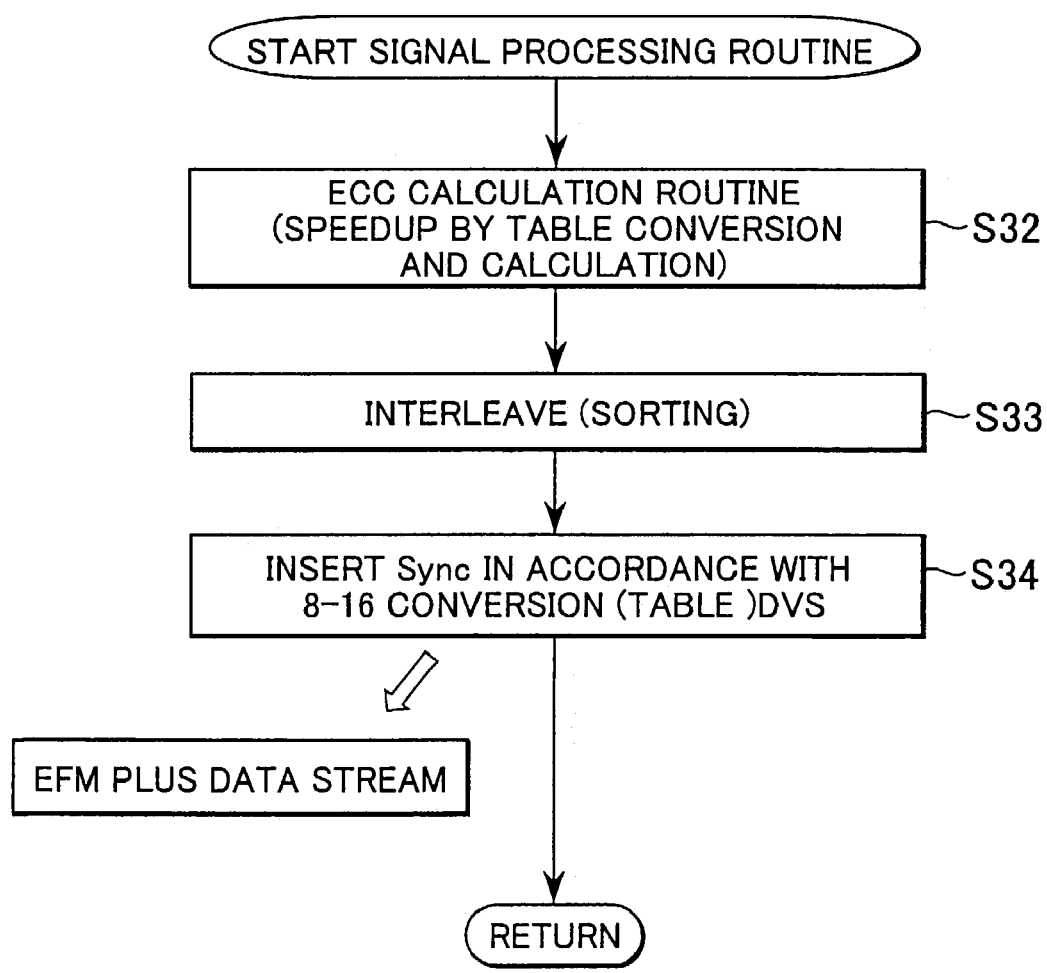
FIG. 4 is a flowchart of a signal processing routine of Eight-to-Fourteen Modulation plus of step S15 in FIG. 2, which is an embodiment of the present invention.
Figure 5:
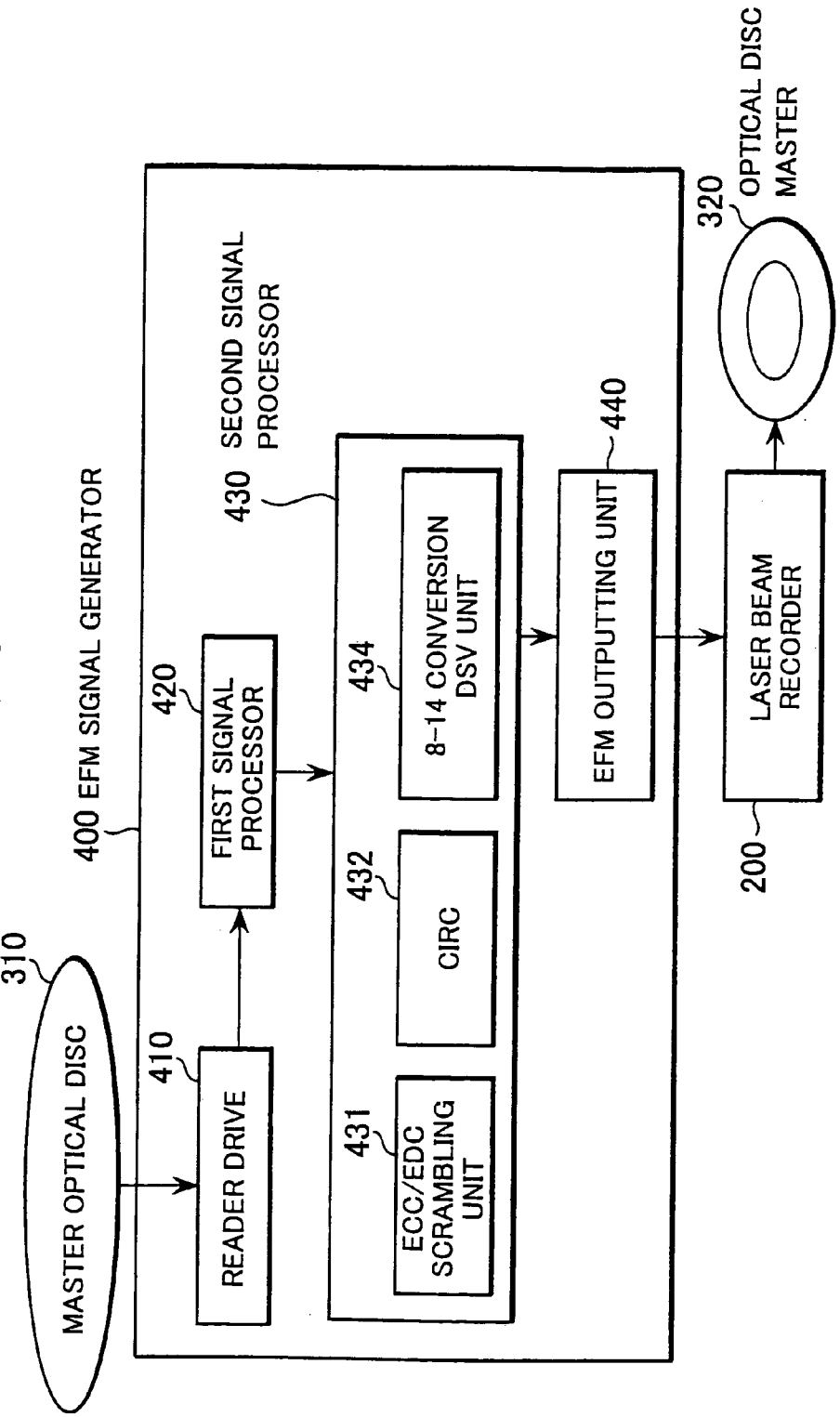
FIG. 5 shows a structural view of a conventional optical disc master producing system.

Next, the EFM plus signal modulation processing used for DVD will be explained. FIG. 4 is a flowchart of an EFM plus signal processing routine, which is an embodiment of the present invention.

As in the case with the EFM signal processing routine, the EFM plus signal processing routine is called out after the data of a process unit is taken in so as to start the process. At this point, the format to be processed is already determined.

In step S32, the CPU activates an ECC calculation routine. By carrying out table conversion and calculation in accordance with the ECC calculation routine, parity of Reed-Solomon Code used for DVD is generated. Subsequently, in step S33, the CPU performs interleave (data sorting), and then, in step S34, the CPU performs 8–16 conversion using a conversion table, calculates a DSV so as to determine and insert State and Sync, generates an EFM plus data stream and returns to the flow of the signal generation method.

Now, a case where a new format is added to the above-mentioned signal processing routine is considered. For example, in a case of supporting a new format in which a method of data sorting is modified, a new process for the new format is added to the process of interleave (processes of steps S22 and S33). Alternatively, it can be realized by the CPU calling out a new interleave process module instead of the process of step S22 or step S33.

In addition, in the above explanation, the EFM signal processing is defined to be a signal processing routine separated from that of the EFM plus signal processing. However, since each signal processing is modularized and includes steps in common with the other signal processing, such as interleave or the like, it is possible to have both the EFM signal processing and the EFM plus signal processing in a single signal processing routine by the CPU determining a format at the first step of each processing module and controlling the process to be branched.

In this way, it becomes possible to cope with a variety of formats and support a new format or a special format easily by changing the module constituting the signal processing routine. In addition, it becomes possible to store and to reuse the modulated signal, which enables reduction of steps for producing an optical disc master.

The processing function mentioned above can be realized with a computer. In such a case, process contents of a function to be included in the modulated signal generator for producing an optical disc master are to be described in a program recorded in a recording medium readable by a computer. The above mentioned process is realized by a computer by executing the program in the computer. A magnetic recording device, a semiconductor memory and the like are examples of the computer-readable recording medium. In a case of distributing such a program, the program may be stored in a portable-type recording medium, such as a CD-ROM (Compact Disc Read Only Memory) or a floppy disk, or the program may be stored in a memory of a computer connected via a network so as to transfer the program to another computer through the network. In executing the program in the computer, the program is stored in a hard disk device or the like of the computer and is loaded in a main memory to be executed.

INDUSTRIAL APPLICABILITY

According to the present invention, a modulation processing program for converting information data to be recorded on an optical disc master into a format of a modulated signal is stored in a device in advance, and the modulation processing is carried out on the information data in accordance with the modulation processing program. Accordingly, if the modulation processing program is changed, it is possible to support a variety of formats, or a new format and a special format easily. In addition, since an dedicated IC or hard logic is not required, the modulated signal generator can be built at a lower cost.

The invention claimed is:

1. A modulated signal generator for generating a modulated signal for producing an optical disc master, comprising:
   information reproducing means for reading and reproducing predetermined information data to be recorded on said optical disc master from a master medium having recorded therein said predetermined information data;
   modulation processing storing means having stored therein plural modulation processing programs constituting signal modulation processing units such as an interleave process, generation process of Reed-Solomon codes, generation process of sub-codes, 8–14 conversion process, 8–16 conversion process, or digital sum value process;
   modulation controller means for carrying out modulated signal processing, based on one of the modulation processing programs, selected in accordance with the predetermined information data reproduced by said information reproducing means to generate a modulated signal data stream; and
   modulated signal output means for outputting the modulated signal data stream generated by said modulation controller means at a predetermined clock.

2. The modulated signal generator for producing an optical disc master according to claim 1, further comprising:
   modulated information storing means for storing said modulated signal data stream generated by said modulation controller means, wherein:
   said modulation controller means further functions to store the generated modulated signal data stream in said modulated information storing means, and to read out the modulated signal data stream stored in said modulated information storing means at necessity so as to output the data stream to said modulated signal output means.

3. A method of generating a modulated signal for producing an optical disc master, comprising:
   a recording step for recording in a modulation processing storing means in advance a modulation processing program for carrying out signal modulation processing by which information data is converted into a modulated signal data stream of a predetermined format;
   a reproducing step for reading out and reproducing predetermined information data to be stored in said optical disc master from an entire information area of a master medium having recorded therein said predetermined information data;
   a modulation processing storing step storing therein plural modulation programs constituting signal modulation processing units such as an interleave process, generation process of Reed-Solomon codes, generation process of sub-codes, 8–14 conversion process, 8–16 conversion process, or digital sum value process;
   a generation step for carrying out the signal modulation processing in accordance with one of the modulation processing programs selected in accordance with predetermined information data reproduced by said information reproducing means on the reproduced information data and generating a modulated signal data stream; and
   an outputting step for outputting said modulated signal data stream at a predetermined clock.

\* \* \* \* \*